United States Patent
Lee et al.

(10) Patent No.: US 11,641,634 B2
(45) Date of Patent: *May 2, 2023

(54) METHOD AND SYSTEM FOR REGIONAL DATA NETWORK CONFIGURATION IN WIRELESS COMMUNICATION NETWORK

(71) Applicant: Samsung Electronics Co., Ltd., Suwon-si (KR)

(72) Inventors: Jicheol Lee, Suwon-si (KR); Jinsung Lee, Suwon-si (KR); Kisuk Kweon, Suwon-si (KR); Daegyun Kim, Seongnam-si (KR); Sangjun Moon, Seoul (KR); Jungshin Park, Seoul (KR); Beomsik Bae, Suwon-si (KR); Joohyung Lee, Gwacheon-si (KR); Hyungho Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 32 days.

This patent is subject to a terminal disclaimer.

(21) Appl. No.: 17/302,967

(22) Filed: May 17, 2021

(65) Prior Publication Data
US 2021/0282102 A1 Sep. 9, 2021

Related U.S. Application Data

(63) Continuation of application No. 16/827,377, filed on Mar. 23, 2020, now Pat. No. 11,012,965, which is a
(Continued)

(30) Foreign Application Priority Data

Oct. 10, 2016 (KR) .................. 10-2016-0130903
Mar. 14, 2017 (KR) .................. 10-2017-0032029
Apr. 21, 2017 (KR) .................. 10-2017-0051738

(51) Int. Cl.
*H04W 60/00* (2009.01)
*H04W 80/10* (2009.01)
(Continued)

(52) U.S. Cl.
CPC ............. *H04W 60/00* (2013.01); *H04W 8/02* (2013.01); *H04W 68/02* (2013.01); *H04W 76/10* (2018.02); *H04W 80/10* (2013.01); *H04W 12/06* (2013.01)

(58) Field of Classification Search
CPC ..... H04W 8/08; H04W 72/042; H04W 76/10; H04W 76/11; H04W 36/08; H04W 60/00;
(Continued)

(56) References Cited

U.S. PATENT DOCUMENTS 9,301,333 B2 3/2016 Chin et al.
2007/0079013 A1 4/2007 Tumsi Dayakar et al.
(Continued)

FOREIGN PATENT DOCUMENTS

EP 0964587 A2 12/1999
KR 10-2008-0032938 A 4/2008
(Continued)

OTHER PUBLICATIONS

Decision of Patent dated Feb. 4, 2022, in connection with Korean Application No. 10-2021-0102117, 5 pages.
(Continued)

*Primary Examiner* — Christopher M Brandt

(57) ABSTRACT

Disclosed is a 5G or pre-5G communication system for supporting a data transmission rate higher than that of a 4G communication system such as LTE. According to an embodiment of the present invention, a method of a terminal in a wireless mobile communication system comprises the steps of: receiving data network information including data network access permission region information and data
(Continued)

network identification information; checking whether the terminal enters a data network access permission region, on the basis of the data network information; and performing a data network access procedure on the basis of the checking result.

12 Claims, 16 Drawing Sheets

Related U.S. Application Data continuation of application No. 16/327,743, filed as application No. PCT/KR2017/009103 on Aug. 21, 2017, now Pat. No. 10,602,472.

(60) Provisional application No. 62/377,888, filed on Aug. 22, 2016.

(51) Int. Cl.
  *H04W 76/10* (2018.01)
  *H04W 8/02* (2009.01)
  *H04W 68/02* (2009.01)
  *H04W 12/06* (2021.01)

(58) Field of Classification Search
  CPC . H04W 36/0022; H04W 36/14; H04W 48/18; H04W 76/12; H04W 36/0033; H04W 8/22; H04W 28/0268; H04W 48/16; H04W 48/20; H04W 76/15; H04W 28/06; H04W 48/04; H04W 74/0833; H04W 80/10; H04W 24/02; H04W 36/0027; H04W 36/305; H04W 36/385; H04W 40/24; H04W 48/00; H04W 48/10; H04W 48/12; H04W 36/00835; H04W 72/0406; H04W 72/044; H04W 76/19; H04W 76/34; H04W 84/12; H04W 68/02; H04W 12/06
  See application file for complete search history.

(56) References Cited

U.S. PATENT DOCUMENTS

| | | |
|---|---|---|
| 2008/0174491 A1 | 7/2008 | Kim et al. |
| 2008/0242350 A1 | 10/2008 | Gupta et al. |
| 2011/0045834 A1 | 2/2011 | Kim et al. |
| 2011/0122783 A1 | 5/2011 | Lin et al. |
| 2011/0268098 A1 | 11/2011 | Keller et al. |
| 2013/0003698 A1 | 1/2013 | Olvera-Hernandez et al. |
| 2015/0296366 A1 | 10/2015 | Lee et al. |
| 2015/0350870 A1 | 12/2015 | Horn et al. |
| 2017/0332312 A1 | 11/2017 | Jung et al. |
| 2019/0182723 A1 | 6/2019 | Sharma et al. |
| 2019/0182884 A1 | 6/2019 | Deenoo et al. |
| 2020/0128507 A1* | 4/2020 | Ryu ............... H04W 60/04 |

FOREIGN PATENT DOCUMENTS

| | | |
|---|---|---|
| KR | 10-2008-0049028 A | 6/2008 |
| KR | 10-2012-0021312 A | 3/2012 |
| KR | 10-2016-0056118 A | 5/2016 |
| KR | 10-2016-0084330 A | 7/2016 |

OTHER PUBLICATIONS

3GPP TS 23.501 V1.0.0 (Jun. 2017), Technical Specification, 3rd Generation Partnership Project; Technical Specification Group Services and System Aspects; System Architecture for the 5G System; Stage 2 (Release 15), Jun. 2017, 145 pages.
3GPP TS 23.502 V1.0.0 (Sep. 2017), Technical Specification, 3rd Generation Partnership Project; Technical Specification Group Services and System Aspects; Procedures for the 5G System; Stage 2 (Release 15), Sep. 2017, 165 pages.
Qualcomm Incorporated, "Additional concepts and corrections for support for connectivity to a local area network," S2-170757, SA WG2 Meeting #S2-119, Dubrovnik, Croatia, Feb. 13-17, 2017, 4 pages.
Samsung, "Evaluation and Update to Solution 4.25: Local Area Data Network," S2-166453, SA WG2 Meeting #S2-118, Reno, Nevada, USA, Nov. 14-18, 2016, 6 pages.
ISA/KR, "International Search Report and Written Opinion of the International Searching Authority," Application No. PCT/KR2017/009103, dated Nov. 3, 2017, 12 pages.
Supplementary European Search Report dated May 27, 2019 in connection with European Patent Application No. 17 84 3910, 8 pages.
"Local Area Data Network for 5G System Architecture" by Lee et al., dated Nov. 2018 (Year: 2018).
"TS 23.501—Update 5.13 Edge Computing" (S2-173971) by 3GPP SA WG2, dated May 2017 (Year: 2017).
Decision of Patent dated Jan. 18, 2021 in connection with Korean Application No. 10-2017-0051738, 5 pages.
ETSI TS 123 401 V13.7.0 (Jul. 2016), Technical Specification, LTE; General Packet Radio Service (GPRS) enhancements for Evolved Universal Terrestrial Radio Access Network (E-UTRAN) access, (3GPP TS 23.401 version 13.7.0 Release 13), Jul. 2016, 374 pages.

* cited by examiner

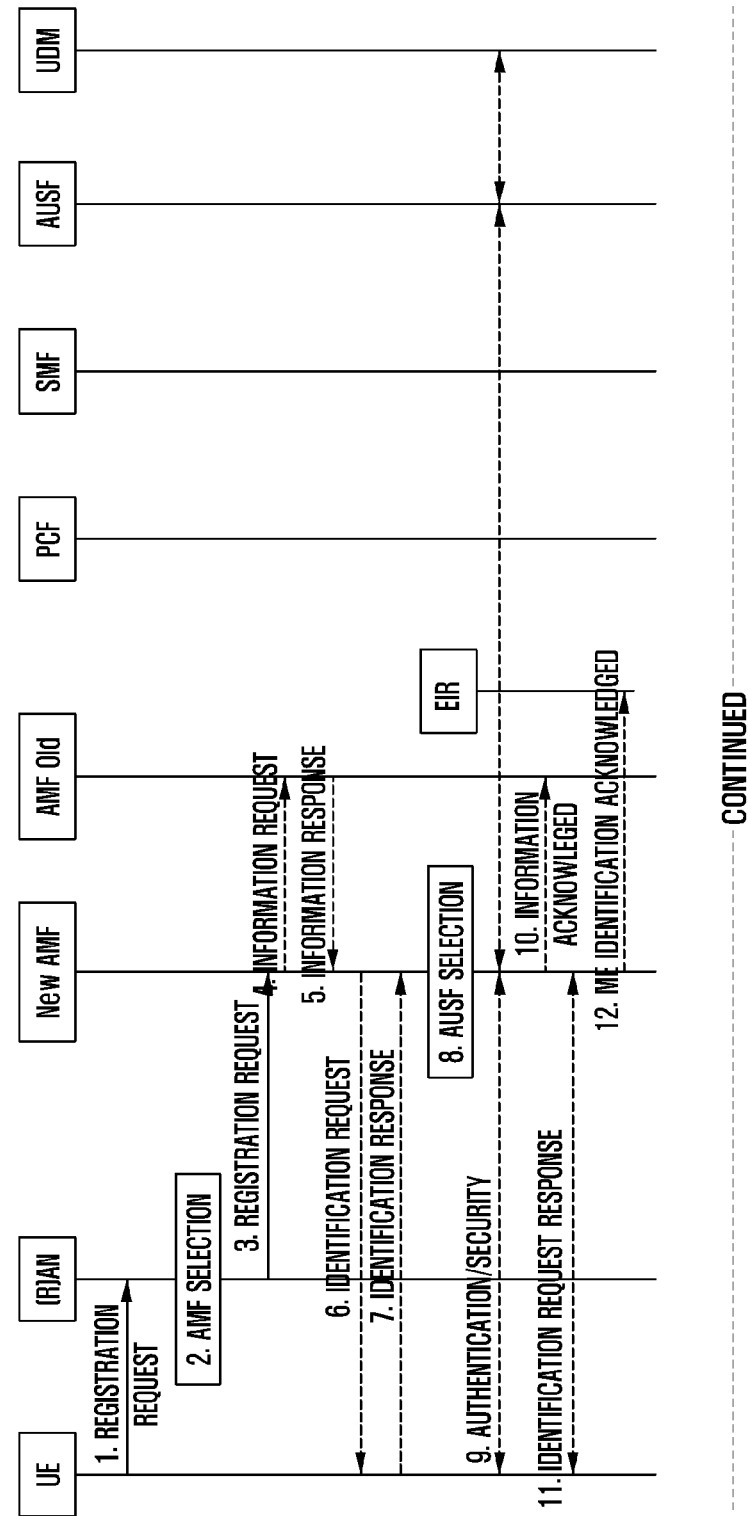

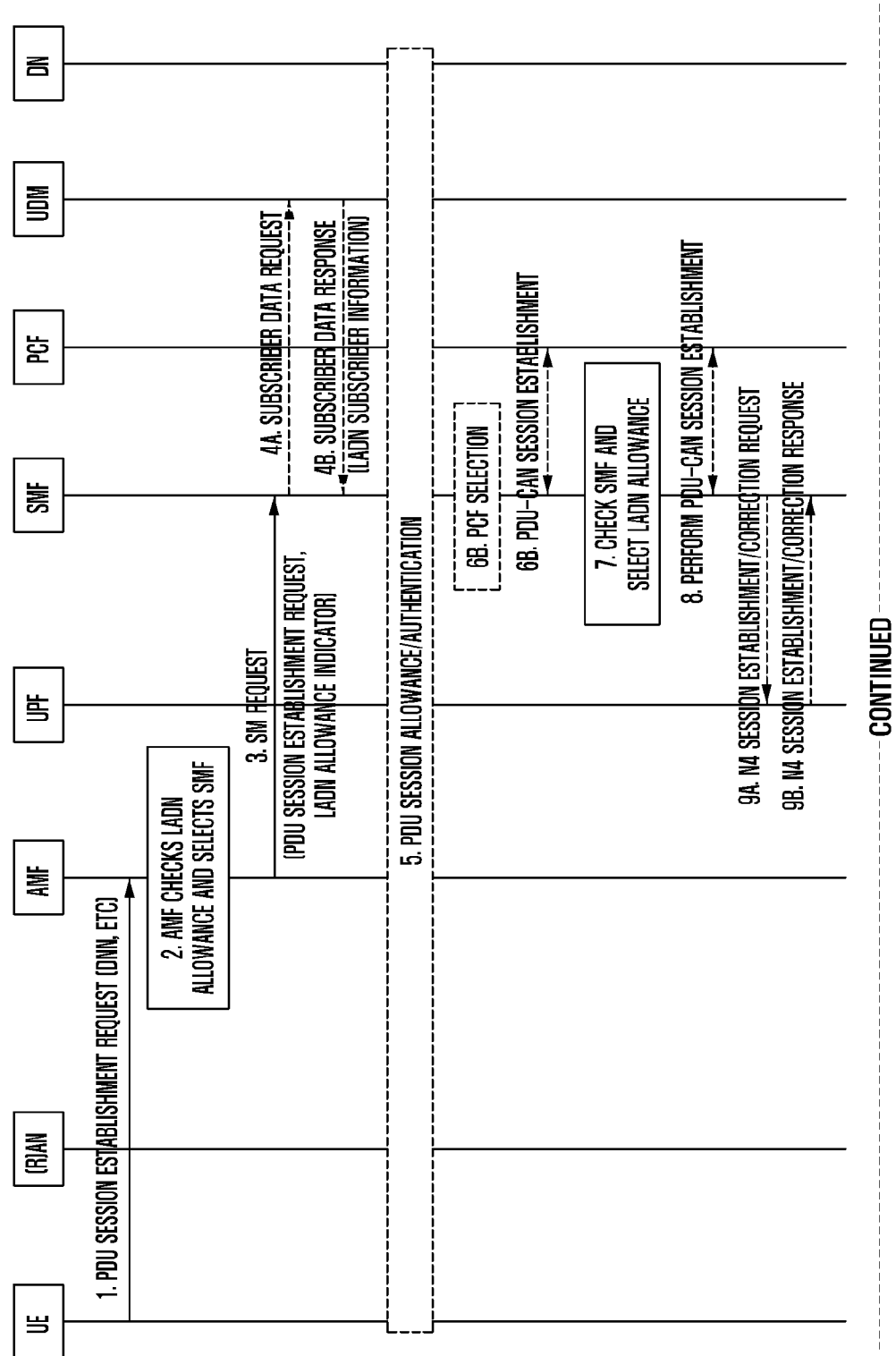

METHOD AND SYSTEM FOR REGIONAL DATA NETWORK CONFIGURATION IN WIRELESS COMMUNICATION NETWORK

CROSS-REFERENCE TO RELATED APPLICATIONS

This application is a continuation of U.S. application Ser. No. 16/827,377, filed Mar. 23, 2020, which is a continuation of U.S. application Ser. No. 16/327,743, filed Feb. 22, 2019, now U.S. Pat. No. 10,602,472, which is a 371 National Stage of International Application No. PCT/KR2017/009103, filed Aug. 21, 2017, and which claims the benefit of U.S. Provisional Application No. 62/377,888, filed Aug. 22, 2016 and claims priority to Korean Patent Application No. 10-2016-0130903, filed Oct. 10, 2016, Korean Patent Application No. 10-2017-0032029, filed Mar. 14, 2017 and Korean Patent Application No. 10-2017-0051738, filed Apr. 21, 2017, the disclosures of which are herein incorporated by reference in their entireties.

BACKGROUND

1. Field

The present disclosure relates to a method and a device for selecting a cell in a mobile communication system, and more particularly, to a method and a device for selecting a cell, which enable a base station to transmit data not only in a licensed frequency band but also in an unlicensed frequency band.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

On the other hand, in the 3GPP that is in charge of cellular mobile communication standards, a new core network structure is called a 5G core (5GC), and the standardization thereof is in progress to achieve evolution from the existing 4G LTE system into a 5G system.

In comparison to an evolved packet core (EPC) that is a network core for the existing 4G, the 5GC supports the following discriminatory functions.

First, in the 5GC, a network slice function is introduced. In accordance with the 5G requirements, the 5GC should support various terminal types and services. For example, services provided in the 5G may include enhanced mobile broadband (eMBB), ultra-reliable low-latency communications (URLLC), and massive machine type communications (mMTC) services. Such terminals and services have different requirements with respect to the core network.

For example, the eMBB service may require a high data rate, whereas the URLLC service may require a high stability and low latency.

Technology proposed to satisfy such various service requirements is a network slice scheme. The network slice is a method for making several logical networks through virtualization of one physical network, and respective network slice instances (NSIs) may have different characteristics since they may have network functions (NFs) to match their characteristics. Accordingly, the 5G network can efficiently support several 5G services through assignment of the NSIs matching the characteristics of the required services to respective terminals.

Second, the 5GC can easily support network virtualization paradigms through separation of a mobility management function and a session management function from each other. In the existing 4G LTE, all terminals can be provided with services in the network through signaling exchanges with single core equipment called a mobility management entity (MME) that is in charge of registration, authentication, mobility management, and session management functions. However, in the 5G, the number of terminals is explosively increased, and the mobility and traffic/session characteristics that should be supported in accordance with the terminal types are sub-divided. In this case, if the single equipment, such as the MME, supports all the functions, scalability to add entities for necessary functions cannot help being deteriorated. Accordingly, in view of the function/implementation complexity of the core equipment that is in charge of a control plane and signaling load, various functions for scalability improvements have been developed based on a structure for separating the mobility management function and the session management function from each other.

In the LTE system, all IP traffics from terminals are anchored at a PDN-GW. Further, for latency improvement in a backhaul network, local IP access (LIPA) and selected IP traffic offloading (SIPTO) have been proposed to locate an IP anchor close to the terminal. In such a structure, a PDN connection of the terminal is established, but there is no way to automatically establish or disconnect the PDN connection in accordance with the location of the terminal.

The present disclosure proposes a method for discovering a local area data network available in a place where a terminal is located, and establishing, disconnecting, or disabling a PDU session for connecting the data network of the terminal in accordance with the location of the terminal.

SUMMARY

In the 3GPP evolved packet core network that is the existing 4G mobile communication network, there is no way to provide information on a data network available to a terminal in accordance with the location of the terminal, to establish a session connection for transmission/reception of a packet data unit with the terminal, and to enable/disable the established session in accordance with the location of the terminal. The packet data unit that is transmitted or received with respect to the terminal may be an IP datagram, Ethernet frame, or unstructured packet.

In other words, there exists no method for providing a data network connection through which packet transmission/reception is possible only in a specific location. Accordingly, it is not possible for a network operator to provide a local area data network service that makes it possible to use a data network only in a specific area.

The present disclosure proposes a method for providing, to a terminal, data network information available in an area where the terminal is currently located, establishing a data network session usable in the corresponding area using the available data network information provided to the terminal, and disconnecting or temporarily interrupting (or disabling) the established session if the terminal gets out of an area where the terminal is allowed to transmit or receive the data session.

Further, the present disclosure proposes a method for reactivating or resuming the temporarily interrupted (or activated) session when the terminal moves again to the area where the terminal is allowed to transmit or receive the session in a state where the session of the terminal is established.

In one aspect of the present disclosure, a method of a terminal includes receiving data network information including data network access allowed area information and data network identification information; identifying whether to enter a data network access allowed area based on the data network information; and performing a data network access procedure based on the result of the identification.

In another aspect of the present disclosure, a method of a network entity includes transmitting, to a terminal, data network information including data network access allowed area information and data network identification information; receiving a service request from the terminal; identifying whether it is possible to provide a service to the terminal based on a location of the terminal and the data network information; and providing the service to the terminal based on the result of the identification.

In still another aspect of the present disclosure, a terminal includes a transceiver configured to transmit and receive signals; and a controller configured to receive data network information including data network access allowed area information and data network identification information, identify whether to enter a data network access allowed area based on the data network information, and perform a data network access procedure based on the result of the identification.

In yet still another aspect of the present disclosure, a network entity includes a transceiver configured to transmit and receive signals; and a controller configured to transmit, to a terminal, data network information including data network access allowed area information and data network identification information, receive a service request from the terminal, identify whether it is possible to provide a service to the terminal based on a location of the terminal and the data network information, and provide the service to the terminal based on the result of the identification.

In an embodiment of the present disclosure, a session access allowed area (data network (DN) service area) may be defined using a tracking area list or a cell list.

In an embodiment of the present disclosure, the terminal may detect entry into or exit from the DN service area through identification of the defined DN service area.

In an embodiment of the present disclosure, in order to notify a network whether an established session is activated or deactivated when the terminal detects the entry into or the exit from the DN service area, the terminal may perform a tracking area update procedure, or a 5G system may perform a registration update procedure. Further, as another method, in an embodiment of the present disclosure, when the terminal detects the entry into or the exit from the DN service area, the terminal may perform the registration update procedure in order to disable or disconnect a session in a 5G core network.

In an embodiment of the present disclosure, when the terminal secedes from the DN service area, the network may disable the session of the terminal without disconnecting the session of the terminal. In a state where the session of the terminal is deactivated, the terminal and the network may discard transmitted or received packets.

In an embodiment of the present disclosure, if the terminal returns to the DN service area, the session of the terminal may be resumed or reactivated. The terminal may perform a registration update procedure to enable the network to update the session state of the terminal.

In an embodiment of the present disclosure, if the terminal gets out of the DN service area, the terminal may perform a tracking area update procedure, that is, a registration update procedure, to notify an access and mobility management function (AMF) managing mobility of the terminal in the network that the session state of the terminal has been changed.

The AMF may notify a session management function (SMF) that the session state has been changed. Accordingly, the SMF may change the session state to a deactivated state since the terminal is not located in the DN service area. In the network, a user plane function that is in charge of transmission/reception of user traffic of the session under the control of the SMF may discard downlink traffic.

In an embodiment of the present disclosure, in a network where a local area data network (LADN) is supported, session establishment may not be allowed in a place that is not a session establishment allowed area of the terminal. When the terminal sends a session establishment request for connection to the LADN, the AMF determines whether the LADN connection is possible in an area where the terminal is currently located. The AMF may transfer an indicator indicating whether the LADN connection is possible to the SMF.

According to an embodiment of the present disclosure, it is possible to provide a session connection method if a terminal is located in a specific area.

According to an embodiment of the present disclosure, it is possible to provide a method for providing, to a terminal, data network information available in the corresponding area when the terminal performs an initial registration procedure in a network or a registration update procedure.

According to an embodiment of the present disclosure, a terminal can connect to a data network in an area where data network access is possible. Further, if the terminal gets out of an access allowed area after successfully connecting to the data network through a data network connection procedure, the session of the terminal may be deactivated.

BRIEF DESCRIPTION OF THE DRAWINGS

FIGS. 8A and 8B are diagrams illustrating a procedure in which a terminal receives local area data network information;

FIGS. 9A and 9B are diagrams illustrating a local area data network session establishment procedure;

DETAILED DESCRIPTION

Figure 1:
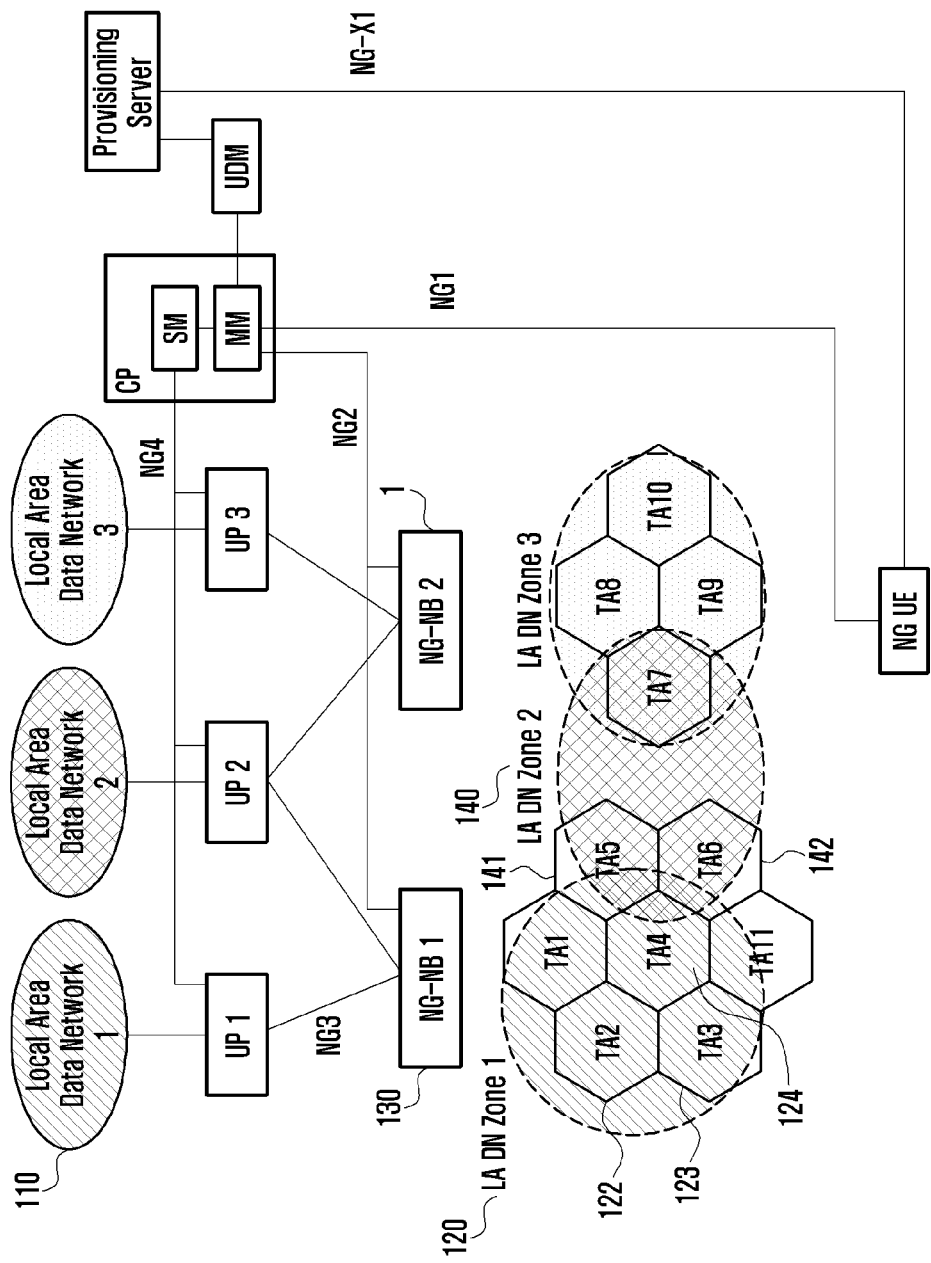
FIG. 1 is a diagram illustrating an example of configuration of a data network access allowed area.

Hereinafter, embodiments of the present disclosure will be described in detail with reference to the accompanying drawings. In the accompanying drawings, it is to be noted that the same drawing reference numerals are used for the same elements if possible. Further, detailed explanation of known functions and configurations that may obscure the subject matter of the present disclosure will be omitted.

In describing the embodiments of the present disclosure, explanation of the technical contents that are well known in the art to which the present disclosure pertains and are not directly related to the present disclosure will be omitted to avoid obscuring the subject matter of the present disclosure and to transfer the same more accurately.

For the same reason, in the accompanying drawings, some constituent elements are exaggerated, omitted, or roughly illustrated. Further, sizes of some constituent elements may not completely reflect the actual sizes thereof. In the drawings, the same drawing reference numerals are used for the same elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

First, in an embodiment of the present disclosure, the concept of a local area data network, a network structure, and a method for implementing the same will be described.

A local area data network means a data network which a terminal (UE) can connect to through a session only in case where the terminal is located in a specific area. The area where the terminal is allowed to connect the local area data network may be called a local area data network zone, which can be identified by a list of tracking areas. The detailed contents will be described later.

In the present disclosure, the local area data network zone may be mixedly used with a data network allowed area, a data network access allowed area, a data network service area, and a data network serviceable area.

Accordingly, in a 5G system, the terminal can connect to the local area data network in the local area data network zone. The local area data network can be used for supporting an enterprise network (internal network), stadium, special event, concert, and IoT service.

Configuration information of the local area data network (it may also be called an available data network) may be configured initially in a network (e.g., AMF), and may be known to the terminal in a process in which the terminal performs an initial registration or registration update procedure. Accordingly, using the information known to the terminal, the terminal may determine that it is located in the local area data network zone (it may also be called a data network access allowed area), and may start a session establishment procedure if an execution of an application program is requested. Further, the terminal may be located in the data network access allowed area, and if the execution of the application program is requested, it may start the session establishment procedure in accordance with a terminal routing selection policy. Further, if the terminal enters the data network access allowed area in case of requesting the execution of the application program, the terminal may start the session establishment procedure.

As described above, the local area data network can be used for supporting the enterprise network, stadium, special event, concert, and IoT service.

First, the present disclosure proposes a method for defining the local area data network.

As the method for defining the local area data network zone (data network access allowed area), four methods as in Table 1 below may be considered.

TABLE 1

| Unit of local area data network zone | Merits | Demerits |
|---|---|---|
| Tracking area | Existing tracking area is reused. | Dependency exists in tracking area. |
| Newly defined area | Optimum area configuration is possible. | Change of RAN standards is necessary. |
| Mobile communication network cell | The smallest unit | Low flexibility |
| RAN paging area | Suited to a narrow area | Operable only in an active state from a viewpoint of terminal core network |

As described above, the unit of the local area data network zone may be defined by various methods. In an embodiment of the present disclosure, it is proposed to reuse the tracking area in the minimum unit of the local area data network zone.

Accordingly, in an embodiment of the present disclosure, the local area data network zone is configured in the unit of a tracking area, and the local area data network zone in the unit of a tracking area can be configured independently of a registration area in the 5G system that the terminal receives in a registration or registration update procedure or a tracking area index list in the 4G system.

Through an initial registration procedure or registration update procedure of the terminal, the network notifies the terminal of the registration area (in the 4G system, corresponding to TAI list) and a list of data network access allowed areas available in the registration area.

FIG. 1 is a diagram illustrating an example of configuration of a data network access allowed area.

As described above, the present disclosure proposes a method for defining a data network access allowed area with a list of tracking areas with respect to one terminal session. Such an area is configured in accordance with an operator's policy.

Referring to FIG. 1, local area data network (LADN) zone 1 (120) where the terminal is allowed to connect to a local area data network 110 may be composed tracking areas 1 to 4 (TA1 to TA4 (121 to 124)).

Accordingly, the terminal can detect entry into or exit from the data network access allowed area through identification of the tracking area. When the terminal detects the entry into or the exit from the data network access allowed area, it can perform a registration update procedure to notify the network whether or not a terminal session is in a usable state.

Figure 2:
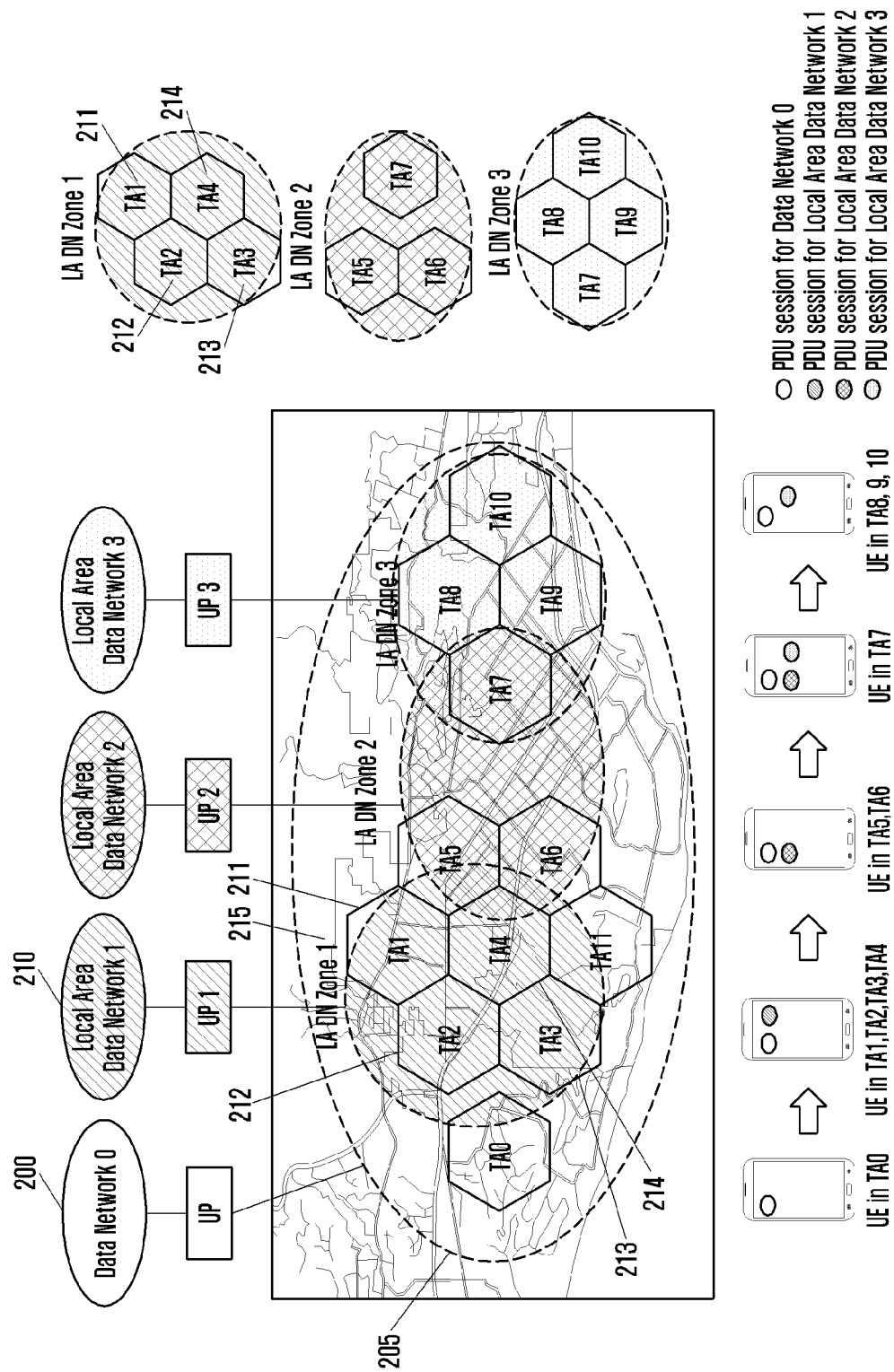
FIG. 2 is a diagram illustrating the concept of a local area data network and the contents of a data network access allowed area.

In the same manner, FIG. 2 is a diagram illustrating the concept of a local area data network and the contents of a data network access allowed area.

Referring to FIG. 2, local area data network (LADN) zone 1 (215) where the terminal is allowed to connect to a local area data network 1 (210) may be composed TA1 to TA4 (211 to 214).

Further, a registration area 205 where the terminal is allowed to connect to data network 0 (200) may include LADN zones 1 to 3, and the terminal can receive information on the registration area and the LADN zone through the registration update procedure.

Second, the present disclosure proposes a method for determining whether a network triggers a PDU session establishment when a terminal enters a data network access allowed area.

It is not always necessary for the network to trigger the session establishment. When the terminal enters a specific area, an application program of the terminal that requests a notification service may establish the session by requesting the session establishment just after being notified of entry into the corresponding area. Accordingly, instead of the session establishment through triggering by the network, it is proposed to add an indicator indicating immediate session establishment when the terminal enters the data network access allowed area.

Accordingly, it is proposed to add information on a session type that is necessary for the immediate session establishment when the terminal enters the data network access allowed area.

The terminal receives information on a session in which the terminal access is allowed and an area where the session is allowed in a registration area (TAI list) received while the terminal performs an initial registration procedure or a registration update procedure in the network. Such information may include an immediate setup indicator when the terminal enters the data network access allowed area.

If the immediate setup indicator is not included in the information, the terminal may start a session establishment procedure at a necessary time in the data network access allowed area.

Third, the present disclosure proposes a method in which a network provides information on an available local area data network to a terminal.

In an embodiment of the present disclosure, three methods as in Table 2 below may be considered.

TABLE 2

| Accessible data network information transfer method | Merits | Demerits |
| --- | --- | --- |
| Broadcast | Pre-configuration or notification for each terminal is unnecessary. | Overhead of a broadcasting message for information transfer Different configurations for terminals are impossible. Change of RAN is necessary. |
| Provisioning in terminal | Configurations for terminals are possible. | If a terminal is far apart from the corresponding area, unnecessary information is configured. |
| Information is notified for each terminal. | Configurations for terminals are possible. | |

Among the above-described methods, in an embodiment of the present disclosure, a method for notifying the information for each terminal is proposed. However, the embodiment of the present disclosure is not limited thereto.

According to the method for notifying the information for each terminal, the network notifies the terminal of the information on the data network access allowed area through an initial registration or registration update procedure of the terminal or a separate procedure for notifying the data network access allowed area.

Fourth, the present disclosure proposes a method for disconnecting a session if a terminal leaves from a data access allowed area.

In accordance with the terminal movement, it is not preferable to immediately disconnect the session when the terminal gets out of the data access allowed area. This is because the terminal may immediately return to the data access allowed area. In this case, if the session is disconnected and then is reestablished again, the network is required to perform a procedure for allocating an IP address of the terminal and a procedure for generating a tunnel (N3 tunnel) between a base station and a core network, and thus complexity is increased.

According to an embodiment of the present disclosure, if the terminal gets out of the data access allowed area, the session may be deactivated instead of session disconnection. If the session is deactivated, the terminal and the network may discard the traffic for the corresponding session. Further, the terminal may notify the network that the terminal has left from the data network access allowed area.

Further, when the terminal returns to the data network access allowed area, the session may be activated. The terminal performs a registration update procedure for updating the location of the terminal so that the network can update the session state.

Accordingly, session deactivated and activated states as in Table 3 below are proposed.

TABLE 3

Session states in accordance with terminal locations

|  | In a data access allowed area | Outside a data access allowed area |
|---|---|---|
| PDU session established | Enabled (activated) state | Disabled (deactivated) state |
| PDU session non-established | Unavailable state | Available state |

Fifth, the present disclosure proposes a method for minimizing signal transfer if a terminal repeats entry into and exit from a data network access allowed area.

In order to match the session state between the terminal and the network in a scenario that the terminal repeats the entry into and exit from the data network access allowed area, it is required to send and receive a large amount of signal processing messages between the terminal and the network.

If the tracking area is changed in an active state of the terminal, a handover procedure is accompanied, and the amount of signal processing message is further increased.

In an idle state of the terminal, an overhead of the signal processing messages becomes severer. This is because, in the idle state of the terminal, a procedure for transitioning the state of the terminal is performed, and thus it is required to transmit or receive a larger amount of signal processing messages. In particular, if there is no data to be transmitted or received through the terminal and the network, great resources may be wasted.

In order to solve such a problem, the present disclosure proposes a lazy update method with respect to a terminal in an idle state. This is because the terminal is not required to update the state of the network in case where the terminal does not transmit or receive data.

Accordingly, in an embodiment of the present disclosure, a lazy status update in a session deactivated state is proposed.

According to the present disclosure, the terminal does not perform a registration update procedure when it enters into or leaves from the data network access allowed area in an idle state. Accordingly, in case where the terminal is located in the data network access allowed area and there is data to be transmitted in the session deactivated state, the terminal may perform the registration update procedure to change the session state.

Further, if downlink data that is directed from the network to the terminal arrives at a user plane function (UPF) while the terminal is located outside the data network access allowed area, the network sends a paging message to the terminal, and the terminal perform a service request procedure to respond to the paging.

When such a procedure is performed, the network identifies whether the terminal can use the session in the area where the terminal is currently located. If it is identified that the area where the terminal is currently located is the area where the terminal is unable to use the session, the network may reject a service request of the terminal. In such a procedure, the session state is changed to a deactivated state.

Hereinafter, the network structure and procedure for providing a local area data network according to an embodiment of the present disclosure will be described. The procedure described hereinafter includes transferring information on a data network allowable area to a terminal, establishing and maintaining a session, and enabling/disabling the session.

As described above, the local area data network is a data network which the terminal can connect and access only in a specific preconfigured area, that is, in a data network access allowed area (i.e., LADN zone or DN allowed area). The data network access allowed area is a logical area in which the location of the terminal can be tracked in the 5G system. One data network access allowed area may be implemented by a set of tracking areas or cells.

Referring to FIG. 1 as described above, local area data network 1 (110) can be connected only in an area where the terminal is located in the data network access allowed area 1 (LADN zone 1 (120)) consisting of TA1 (121), TA2 (121), TA3 (123), and TA4 (124).

That is, one 5G base station (in the drawing, NextGen Node-B (NG-NB) which may include an eLTE base station and a new radio base station) may provide a plurality of LADN zones. In the drawing, NG-NB1 130 can provide a service with respect to parts of LADN zone 1 (120) composed of TA1, TA2, TA3, and TA4, and LADN zone 2 (140) including TA5 (141) and TA6 (142).

With the network structure, an embodiment of the present disclosure has the following characteristics.

1) The data network access allowed area is an area where the terminal is allowed to connect the data network through the session, and can be defined by a set of tracking areas or a set of cells.

2) The data network access allowed area can be configured for each session of the terminal. The data network access allowed area can be configured statically or dynamically in accordance with terminal subscription information and operator's policy.

3) The data network access allowed area for the session can be preconfigured by an AMF that manages mobility of the terminal in the network.

4) When the terminal performs an initial registration procedure or a registration update procedure, the AMF can notify the terminal of available local area network information.

5) While the terminal is located in the data network allowable area, it can establish the session in accordance with the operator's policy. The policy information for the terminal may include information on a policy that prescribes the operation of the terminal when the terminal enters into or exits from the data network allowed area. For example, the LADN entry policy may instruct the terminal to perform the session establishment procedure when the terminal enters the data network allowed area, or may instruct the terminal to notify the network of the current location of the terminal through the registration update procedure.

6) While the terminal is located outside the data network allowable area, the session is deactivated. In another method, if the terminal gets out of the data network access allowed area, the terminal may notify of the current location of the terminal so that the core network disconnects the session. For example, the terminal transfers a registration request message to the AMF. The AMF may instruct the SMF to disconnect the session after identifying the location of the terminal.

The LADN exit policy can instruct the terminal to operate when the terminal monitors the exit from the data network access allowed area. For example, the LADN exit policy can instruct the terminal to perform a session disconnect procedure for the local data network, or to perform the registration update procedure for notifying the network of the current location of the terminal so that the network disconnects or disables the session.

7) The data network access allowed area information may be transferred to the terminal during the session establishment procedure.

8) If the terminal detects entry into or exit from the data network access allowed area by identifying the tracking area, it may perform the registration update procedure to manage the state of the terminal. If the terminal detects the entry into the data network access allowed area by identifying the tracking area and the current cell information, it performs the registration update procedure to notify the core network of the current location of the terminal in accordance with the LADN policy information of the terminal.

Figure 3:
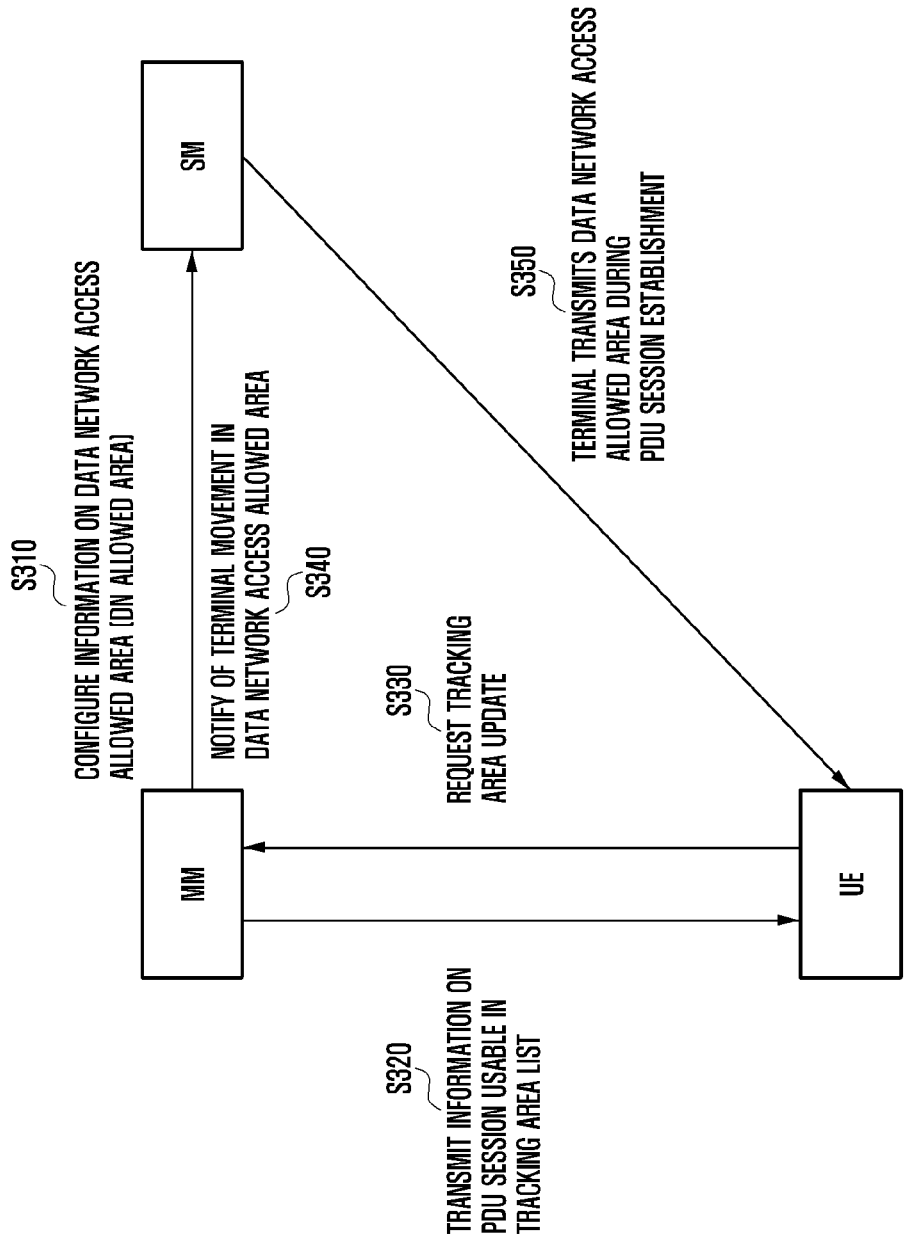
FIG. 3 is a diagram illustrating information flows among a terminal (UE), AMF, and SMF.

The LADN policy information means information received through a policy control function (PCF) of the core network. FIG. 3 illustrates information flows among an AMF, SMF, and terminal (UE).

FIG. 3 is a diagram illustrating information flows among a terminal (UE), AMF, and SMF.

Referring to FIG. 3, MM denotes an AMF, and SM denotes an SMF.

Specifically, referring to FIG. 3, at operation S310, the AMF can configure information on a data network access allowed area (DN allowed area).

Further, at operation S320, the AMF can transmit, to the terminal, information on a PDU session usable in a list of tracking areas.

During the terminal movement, the terminal, at operation S330, may request a tracking area update.

At operation S340, AMF may notify the SMF of the terminal movement in the data network access allowed area. Accordingly, at operation S350, the SMF can transmit the data network access allowed area to the terminal during PDU session establishment.

Figure 4:
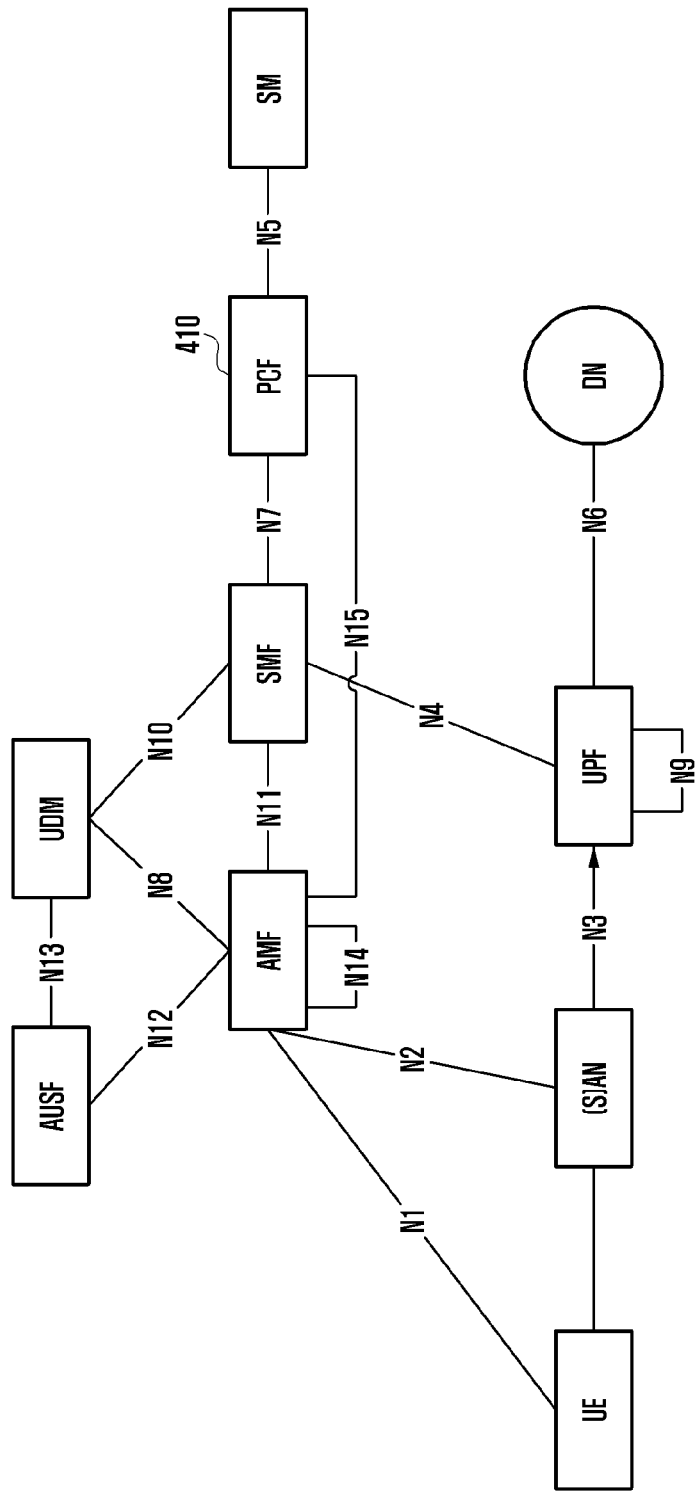
FIG. 4 is a diagram illustrating a network structure including a PCF.

FIG. 4 illustrates the structure of a network including a PCF.

The PCF 410 is a network function that manages the LADN policy for the terminal. The PCF can bear the responsibility for pre-installation and update for the LADN policy of the terminal.

Further, according to an embodiment of the present disclosure, the terminal can perform the following operations.

1) The terminal can receive usable data network information including data network allowed area information (it may be called serviceable area information).

Specifically, when the terminal performs an initial registration procedure or a registration update procedure, the AMF of the core network may notify the terminal of data network availability and serviceable area information of the available data network.

Further, the information may include an indicator requiring immediate establishment of the session for accessing the data network immediately when the terminal enters the data network allowable area. If such an indicator does not exist, the terminal may start the session establishment in need of an application program of the terminal.

2) The terminal can establish the session in the serviceable area.

If the tracking area of a base station that is currently accessed by the terminal is included in the data network allowed area (i.e., if the local area data network that the terminal has received is usable in the area where the terminal is currently located), the terminal can start the session establishment procedure. During the session establishment process, the terminal can receive a total list of areas where the session establishment is allowed. When the session is established in the data network allowed area, the session is in an abled state.

3) The terminal can switch the session state in accordance with the location of the terminal.

Figure 5:
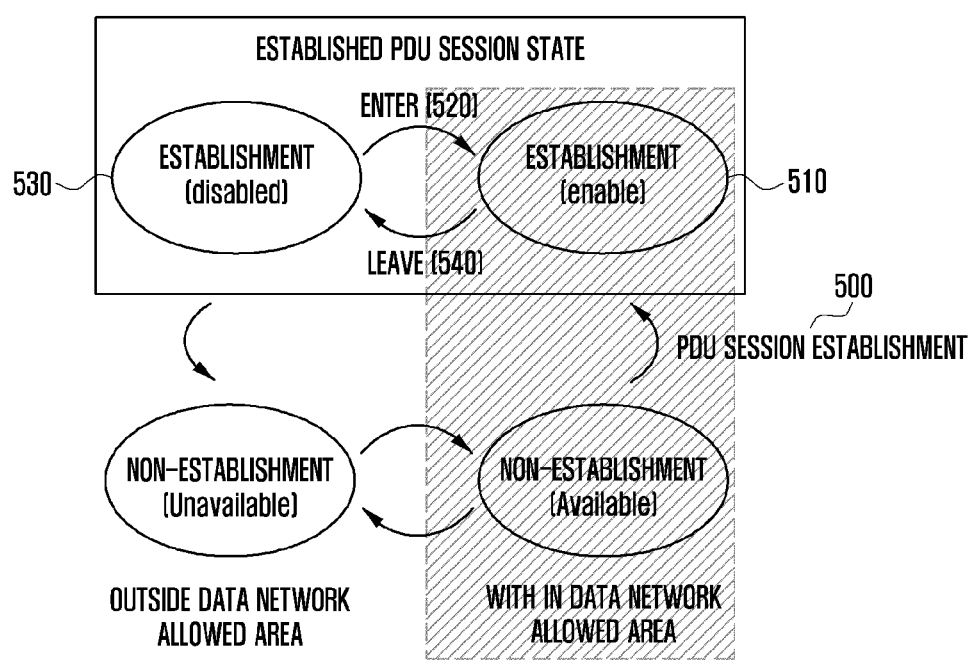
FIG. 5 is a diagram illustrating activated and deactivated states of a session for local area data network support.

FIG. 5 is a diagram illustrating activated and deactivated states of a session for local area data network support.

While the terminal moves in the service area after the terminal and the network established the session (500), the session is maintained in an activated state (510).

If the terminal moves to the data network allowable area (520) in a state where the session of the terminal is deactivated, the terminal can perform the registration update procedure. Specifically, the terminal requests the registration update, the AMF notifies the SMF of location information of the terminal, and the SMF changes the session state of the terminal from the deactivated state (530) to the activated state (510).

The SMF manages the session state, and the UPF can determine to discard user's downlink traffic.

If the terminal gets out of the data network allowed area (540) in the session activated state, the terminal performs the registration update procedure to notify the AMF of the current location of the terminal. The AMF notifies the SMF of the current location information of the terminal, and the SMF switches the session state from the activated state (510) to the deactivated state (530).

If a UPF downlink packet arrives in a state where the session of the terminal is deactivated, the terminal discards the downlink packet without sending a data reception notification message to the SMF, that is, without performing the paging procedure. The terminal discards an uplink packet in the session deactivated state.

Hereinafter, the above-described contents and additional contents will be described in detail.

1. Method for Configuring a Data Network Service Area

Hereinafter, a method for configuring a data network allowed area (it may be called a data network service area or LADN service area) will be described. In the same manner as the registration area 205 of FIG. 2, the registration area may be configured by a set of tracking areas that the 5G core network allocates to the terminal. If the terminal belongs to the registration area, the registration area means an area where it is not necessary for the terminal to perform a tracking area update procedure for terminal mobility or a registration update procedure.

If the terminal gets out of the registration area, it should perform the registration update procedure, and thus it is necessary to consider the registration area when configuring a data network service area.

Figure 6:
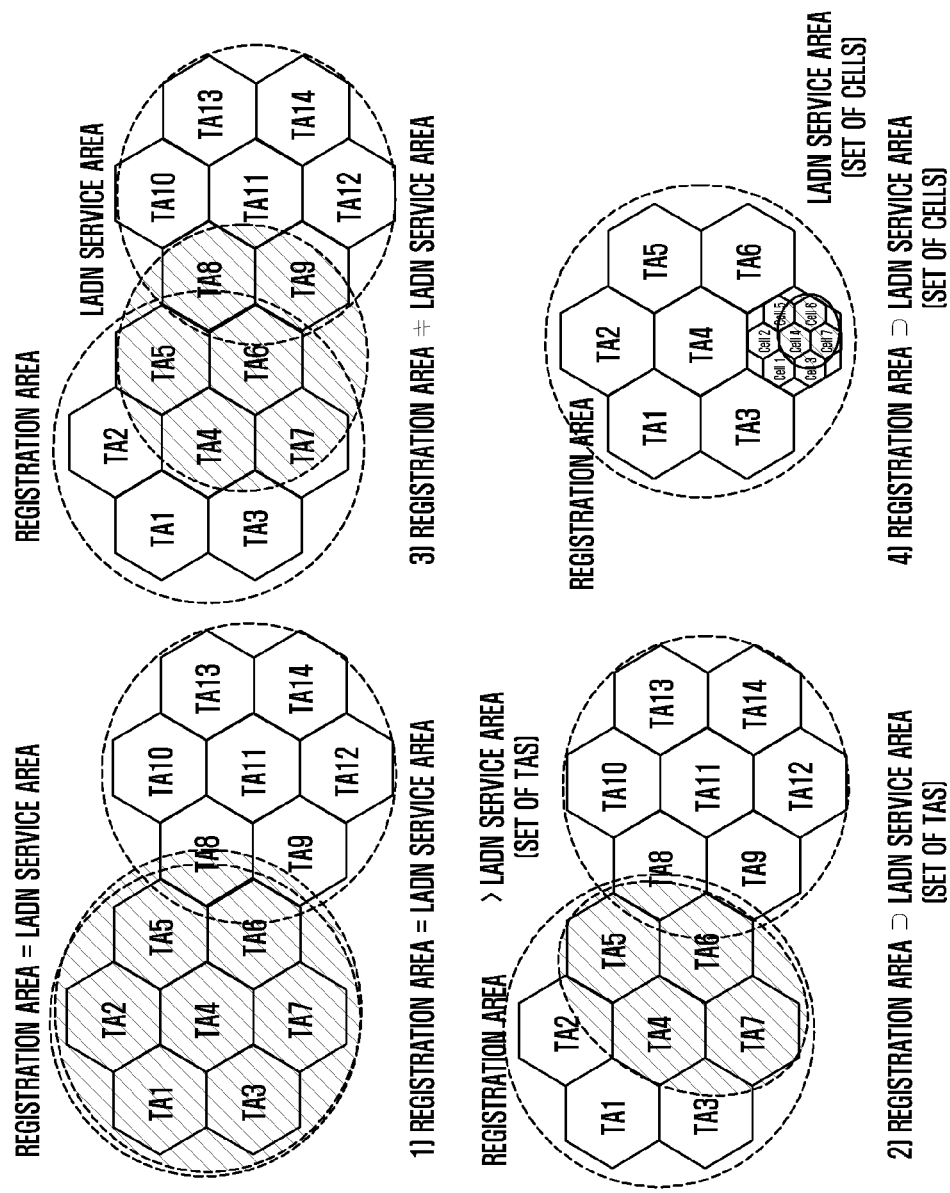
FIG. 6 is a diagram illustrating a data network service area configuration method according to an embodiment of the present disclosure.

When configuring the data network service area, an operator should also consider the registration area, and in accordance with the relationship between the registration area and the data network service area, the following configurations are possible as illustrated in FIG. 6.

FIG. 6 is a diagram illustrating a data network service area configuration method according to an embodiment of the present disclosure.

1) A case where the data network service area composed of tracking areas coincides with one registration area (610)

2) A case where the data network service area composed of tracking areas exists in one registration area (620)

3) A case where the data network service area composed of tracking areas is configured over several registration areas (630)

4) A case where the data network service area composed of a set of cells is configured within one registration area (640)

Further, although not illustrated in FIG. 6, the data network service area may be configured as follows.

Figure 7A:
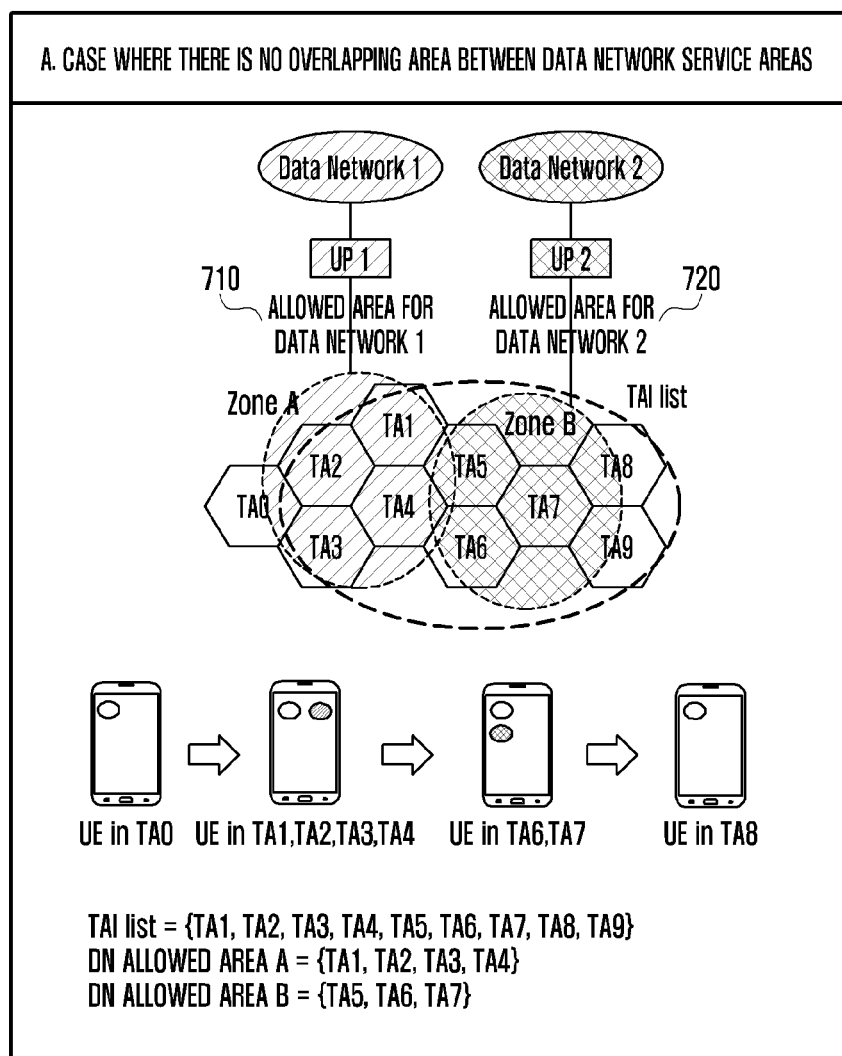
FIGS. 7A and 7B are diagrams illustrating an example of a data network service area configuration method according to an embodiment of the present disclosure.
Figure 7B:
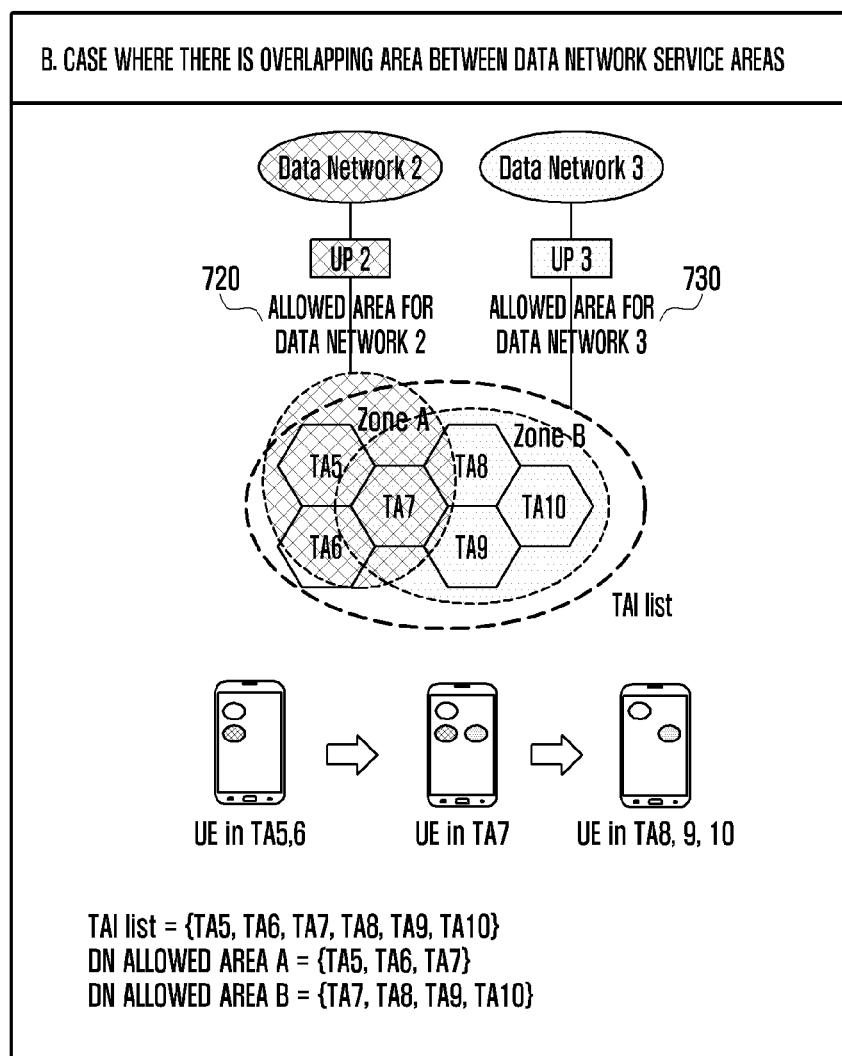

5) A case where the data network service area composed of tracking areas is configured by a plurality of registration areas 6) A case where the data network service area is configured by one whole operator network Separately from those as described above, if one terminal belongs to two or more local area data networks, an intersection of two data service areas may not exist or may exist, as illustrated in FIGS. 7A and 7B, in accordance with the respective service areas of the two or more local area data networks.

FIGS. 7A and 7B are diagrams illustrating an example of a data network service area configuration method according to an embodiment of the present disclosure.

Referring to FIGS. 7A and 7B, the data network service area may be configured so that an overlapping area exists between areas, such as an area allowed for data network 1 (data network service area 1, zone A) 710 and an area allowed for data network 2 (data network service area 2, zone B) 720.

Further, the data network service area may be configured so that an overlapping area exists between areas, such as an area allowed for data network 2 (data network service area 2, zone B) 720 and an area allowed for data network 3 (data network service area 3, zone C) 730.

2. Method for Receiving (or Discovering) Local Area Data Network Information of a Terminal Hereinafter, a method for receiving local area data network information of a terminal will be described.

If the terminal initially accesses a mobile communication network or leaves from a registration area, or in order to periodically notify the network that the terminal is in a call receivable state, the terminal performs the registration procedure. If a local area data network to which the terminal belongs is included in the registration area where the terminal performs the registration procedure while the network registration procedure is performed, the network notifies the terminal of data network information available to the terminal.

Figure 8B:
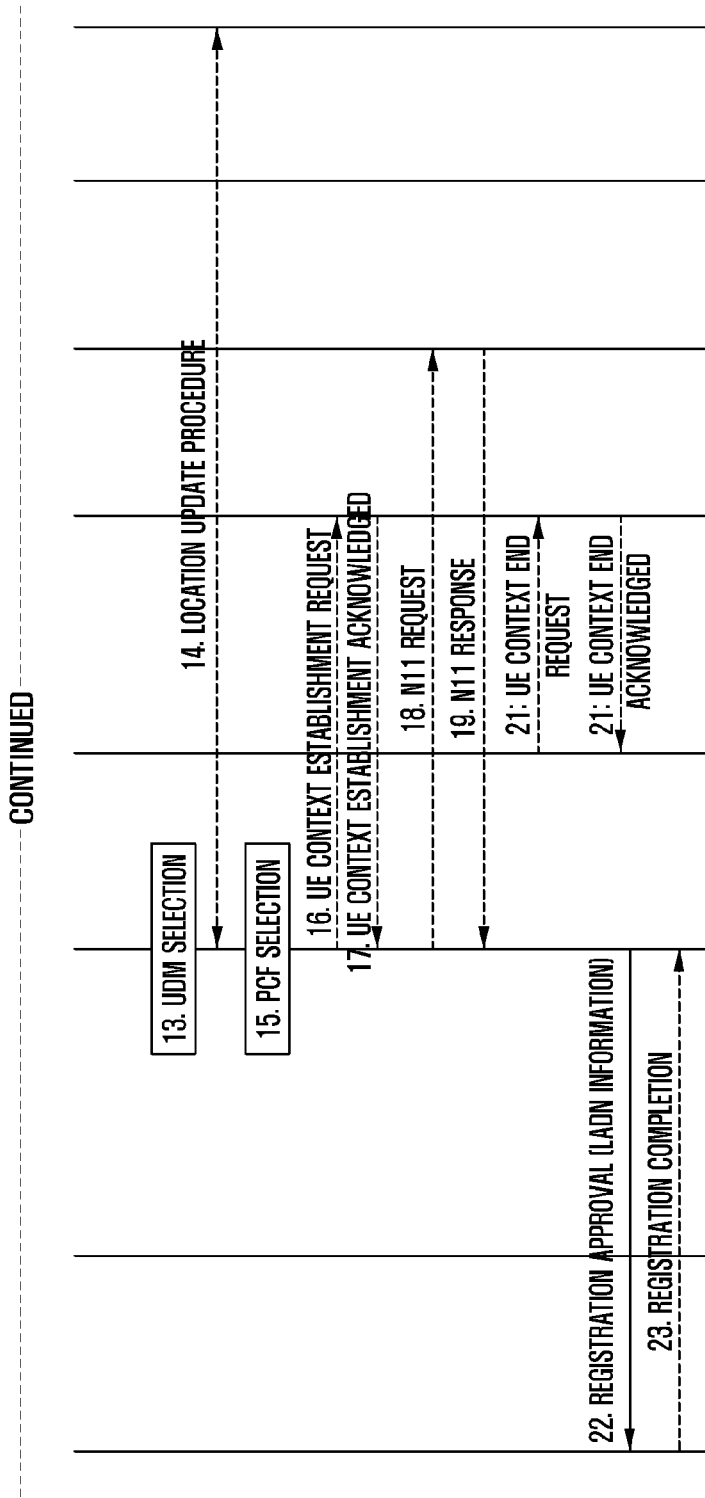

The above-described procedure may be performed as illustrated in FIGS. 8A and 8B.

FIGS. 8A and 8B are diagrams illustrating a procedure in which a terminal receives local area data network information.

Referring to FIGS. 8A and 8B, the terminal may perform the registration procedure. The registration procedure may be performed by the terminal as illustrated in the drawings, and the detailed explanation thereof will be omitted.

On the other hand, in the $22^{nd}$ procedure, the AMF in the network can transmit local area data network (LADN) information to the terminal. The local area data network information includes a data network name (DNN) for discriminating the local area data network and data network allowed area information. The DNN information may be called data network identification information. As exemplarily described above, the data network allowed area information may be the current registration area, a set of tracking areas, a set of cells, a plurality of registration areas, or the whole operator area.

Further, the data network information may include an indicator indicating that the data network corresponding to the DNN can be used only in a specific area.

3. Procedure for Establishing a Local Area Data Network Session of a Terminal

Hereinafter, a procedure for establishing a local area data network session of a terminal will be described.

As described above, the terminal performs the registration procedure, and can be aware of the data network service area. The terminal can be aware of what tracking area corresponds to the currently accessible cell. If the currently accessed cell is included in the data network service area received in the registration procedure, the terminal can be aware that it can be connected to the corresponding local area data network.

If the terminal can be aware that it can establish a connection to the corresponding local area data network through tracking area information or cell information broadcasted in the current cell, and an application layer program of the terminal requires data network connection establishment, the terminal performs a session establishment procedure for establishing the local area data network connection. That is, if the terminal is located in the data network allowed area, and the application layer program requests the session establishment directly or indirectly, the terminal performs a session establishment procedure as exemplified in FIGS. 9A and 9B.

Figure 9B:
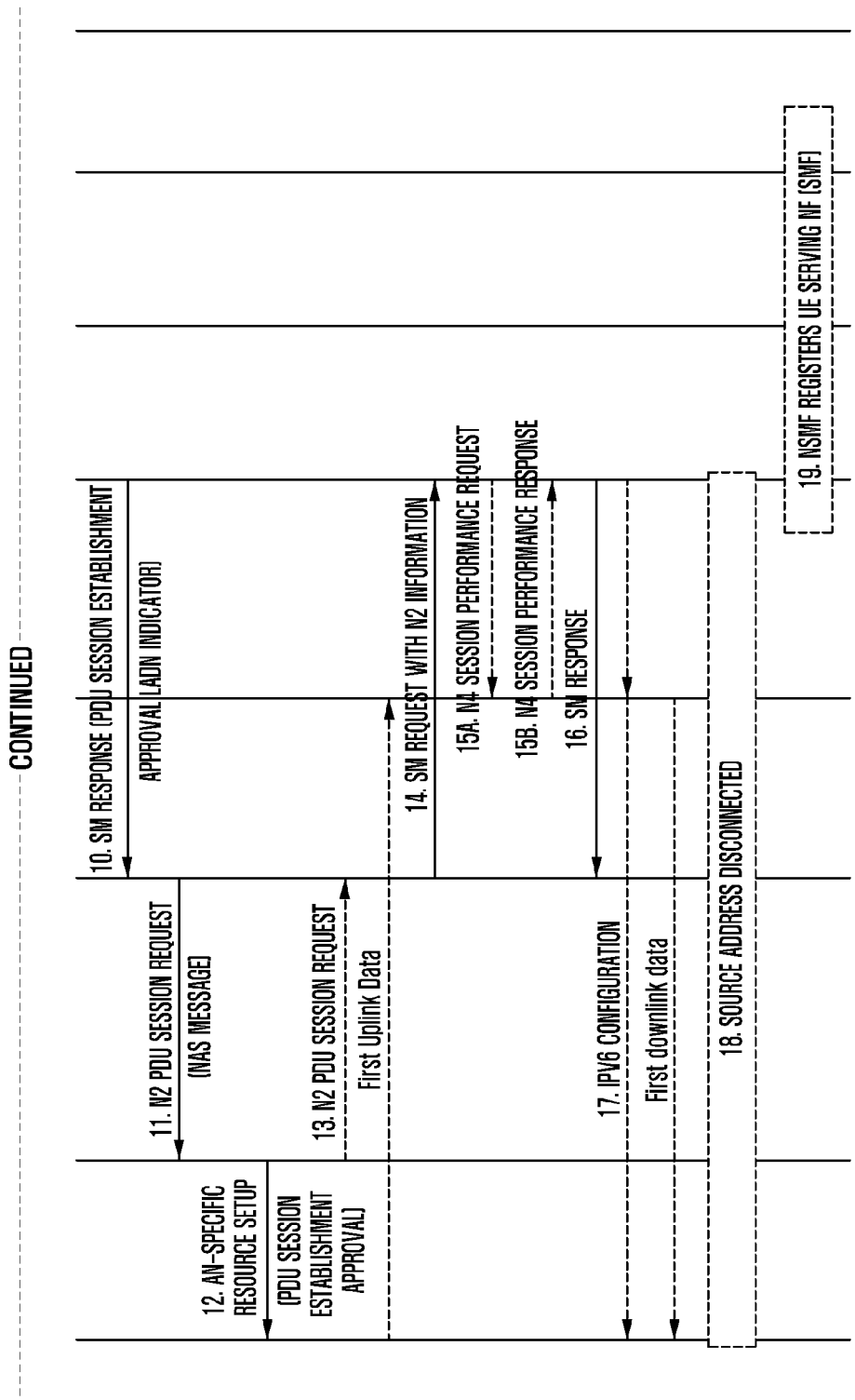

FIGS. 9A and 9B are diagrams explaining a local area data network session establishment procedure.

Referring to FIGS. 9A and 9B, at operation 1, the terminal may include information capable of indicating the local area data network (e.g., DNN information) in a session establishment request message to be transmitted to the network.

At operation 2, if the AMF receives the DNN corresponding to the local area data network, the AMF identifies if the terminal can establish the session for the local area data network connection requested by the terminal in the current location.

At operation 3, the AMF sends a local area data network (LADN) allowable indicator to the SMF. As can be identified at operation 3, the AMF may include the LADN allowable indicator in an SM request message to be transmitted to the SMF.

Thereafter, at operation 4, the SMF receives local area data network subscription information from a UDM, and identifies data network subscription information of the terminal.

At operation 5, allowance and authentication of the PDU session may be performed between the terminal and the network, and at operation 6, the SMF may select the PCF and establish the PDU-CAN session.

Further, at operation 7, the SMF checks whether to allow the data network.

If the SMF allows the data network, the SMF may establish or correct the PDU-CAN session at operation 8, and may transmit an N4 session establishment/correction request message and receive a corresponding response message at operation 9.

At operation 10, the SMF transmits, to the AMF, an LADN indicator indicating that the corresponding session is the local area data network together with a message for allowing the session. Thereafter, if a service request is received from the corresponding terminal outside a serviceable area, the AMF that has received the indicator rejects the corresponding request. The subsequent process may be performed as illustrated in the drawing, and the detailed explanation thereof will be omitted.

If the SMF does not allow the data network, at operation 10, the SMF transmits a session request rejection message to the terminal through the AMF. The rejection message includes an indicator indicating that the session establishment is not allowed in the current area.

If the DNN requested by the terminal is the DNN to which the terminal does not belong, the SMF transfers a rejection code representing "Session establishment is not allowed due to non-subscription of the requested DNN" to the terminal. If the DNN requested by the terminal is not allowed in the current location of the terminal, the SMF transfers a rejection code representing "DNN requested in the current location is not allowed" to the terminal.

As another method for implementing the embodiment, if the terminal requests the session establishment in an area that is not the LADN allowed area, and if the user terminal is a non-subscriber or the current location of the terminal is not the service location of the LADN to which the terminal belongs after the AMF determines whether the user terminal belongs to the LADN and the current location of the user terminal, the AMF may reject the session establishment by sending a session establishment rejection message to the terminal. Specifically, at operation 2 of FIG. 9, the AMF immediately transmit a PDU session rejection message to the terminal through a RAN without transmitting a subsequent message after determining the rejection of the session establishment.

4. Service Request Procedure for a Local Area Data Network Session

Hereinafter, a service request procedure for a local area data network session of a terminal will be described.

In the 5G network, the service request procedure is performed in case where uplink traffic of the terminal exists in a terminal idle state (CM-IDLE state) where a radio resource control (RRC) connection does not exist and in case where the terminal is transitioned to an activated connected state (CM-CONNECTED state) where the RRC connection of the terminal exists.

In addition, in the 5G network, enabling of a selective user plane for each session is supported with respect to the already connected session. For this, even if the terminal is in the activated connected state (CM-CONNECTED state) where the current RRC connection exists, the specific session may stay in a deactivated state. In this case, a service request procedure may be performed to change the session in the deactivated state to the activated state.

In an embodiment of the present disclosure, it is recommended not to send a service request message if uplink traffic occurs after the terminal that has established the session for the local area data network in an idle state moves out of the data network service area.

Figure 10:
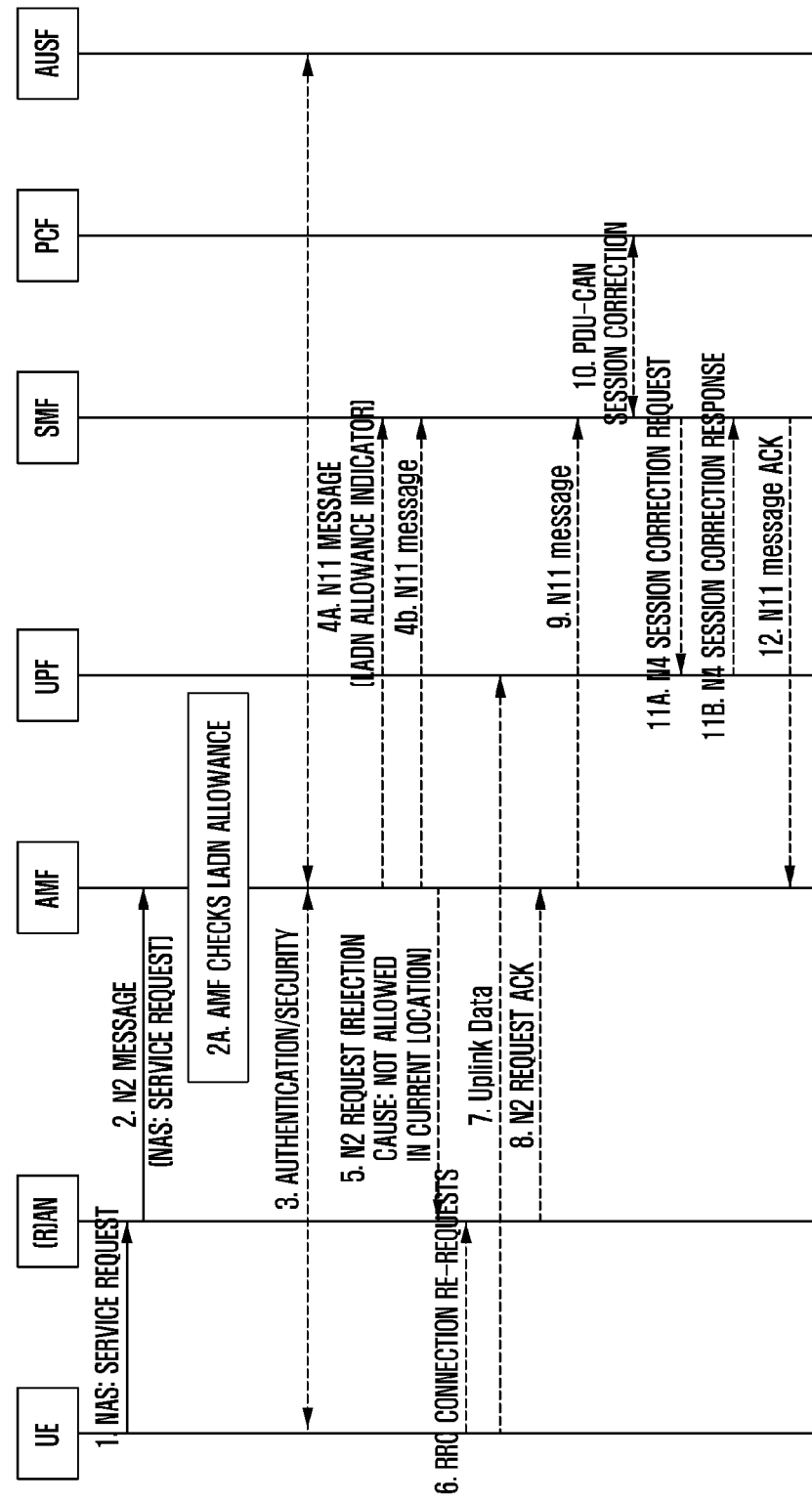
FIG. 10 is a diagram explaining a local area data network session service request procedure.

If uplink traffic for the already established local area data network session occurs in a state where the terminal in the idle state moves out of the date network service area, the terminal may perform a service request as illustrated in FIG. 10. In this case, the network grasps the current location of the terminal, and rejects the service request requested by the terminal together with a rejection code representing that the corresponding session of the terminal is not allowable in the current area.

FIG. 10 is a diagram describing such a procedure in detail.

FIG. 10 is a diagram explaining a local area data network session service request procedure.

Referring to FIG. 10, at operation 1, the terminal may transmit a service request. At operation 2, a base station that has received the request may transmit an N2 message including the service request to the AMF.

At operation 2a, the AMF may determine whether the local area data network session is allowable in the area where the terminal has sent the service request message.

At operation 4a, the AMF sends a local area data network (LADN) allowable indicator to the SMF to notify of whether the local area data network session is allowable.

If the AMF determines that the local area data network is not allowed in the corresponding area, the AMF, at operation 5, rejects the service request together with the rejection code notifying the terminal of "The corresponding session connection is not allowed in the current area".

In contrast, if the local area network is allowed in the corresponding area, the AMF, at operation 5, may transmit an N2 request. As illustrated in the drawing, the subsequent process may be performed, and the detailed explanation thereof will be omitted.

5. Terminal Operation in Case where a Destination Packet Arrives when the Terminal is Out of the Local Area Data Network Service Area When the terminal in an idle state is out of the local area data network service area, a terminal destination packet may arrive at the UPF. In this case, the UPF sends a downlink packet arrival notification to the SMF, and the SMF transfers a downlink packet arrival notification message again to the AMF. The AMF determines that the terminal is in an idle state, and awakes the terminal by sending a paging message to the terminal.

If the terminal receives the paging message, it sends the service request to the network to attempt transition to an activated connected state. If the terminal sends the service request, the AMF determines that the session requesting the downlink packet notification requested by the SMF is a local area data network session and the terminal is located in the area where the corresponding session is currently allowable, and rejects the service request from the corresponding terminal.

6. Terminal Operation by a Local Area Data Network Policy

The 5G network manages a policy for controlling the operation of the terminal through a policy control function (PCF), and installs the policy in the terminal.

If the terminal initially accesses or the policy for the terminal is updated, the 5G network may install or update the terminal related policy in the terminal. Representatively, the terminal related policy is a user traffic routing selection policy (URSP) of the terminal.

In an embodiment of the present disclosure, the terminal policy related to the local area data network of the terminal will be described. In this embodiment, explanation will be made with respect to a local area data network (LADN) entry policy indicating the terminal operation when the terminal detects the entry into the data network service area and a local area data network (LADN) exit policy indicating the terminal operation when the terminal detects the exit from the data network service area.

If the terminal initial access procedure, registration update procedure, or the PCF is necessary, the PCF of the 5G network may configure the terminal LADN entry policy and LADN exit policy in the terminal.

As described above, in case of receiving the usable local area data network information, the terminal receives the available data network service area information, and detects the entry into the configured data network allowed area from the received service area information.

In case of detecting the entry into the data network allowed area, the terminal performs an operation prescribed by the LADN entry policy received from a policy control server. For example, if the LADN entry policy instructs the terminal to establish the session, the terminal performs the session establishment procedure. Further, if the LADN entry policy prescribes the terminal to perform the registration update procedure, the terminal performs the registration update procedure.

In case of detecting leaving from the data network allowed area, the terminal performs an operation prescribed by the LADN exit policy received from the policy control server. For example, if the LADN exit policy prescribes the terminal to perform the registration update procedure for the network session disconnection or deactivation, the terminal performs the registration update procedure. Further, if the LADN exit policy instructs the terminal to disconnect the corresponding session, the terminal performs the session disconnection procedure.

7. Change of the Terminal Route Selection Policy in Accordance with Entry into or Exit from the Data Network Service Area The 5G network manages a policy for controlling the operation of the terminal through a policy control function (PCF), and installs the policy in the terminal.

If the terminal initially accesses or the policy for the terminal is updated, the 5G network may install or update the terminal related policy in the terminal. Representatively, the terminal related policy is a terminal (UE) route selection policy (URSP). The UE route selection policy is used by the terminal, and may be used to determine what session of established sessions the traffic transmitted from the terminal is routed to. The URSP may trigger a new session establishment. The UE route policy may include one or more of the following policies.

1) Service and session continuation (SSC) mode selection policy
2) Network slice selection policy
3) DNN selection policy
4) Non-seamless offloading policy In this embodiment, a case is assumed, in which a method capable of routing the application program traffic of the terminal to the local area data network is used through the DNN selection policy prescribing the application program traffic of the terminal is routed to the local area data network. In this case, this embodiment proposes a method for activating or deactivating the DNN selection policy in accordance with the terminal movement in the local area data service area.

That is, in the present disclosure, in accordance with the data network service area information received by the terminal through the registration procedure, the DNN selection policy for the traffic routing of the terminal to use the local area data network is activated when the terminal enters the data network service area divided through the DNN. Further according to the present disclosure, when the terminal leaves from the data network service area, the corresponding DNN selection policy is deactivated.

8. Method in which Available LADN Information is not Repeatedly Received

The terminal receives LADN information from the AMF of the 5G core network during performing of the registration procedure. In case of performing a periodic registration procedure, the terminal can prevent reception of the same LADN information in the registration area where the previous registration procedure was performed.

Specifically, the terminal stores the LADN information initially received in the same registration area. If the terminal performs the registration procedure in the same registration area as the previous registration area in the periodic registration procedure, the AMF can omit transmission of the LADN information.

As another method for preventing repeated reception of the same LADN information, the AMF may allocate an identifier indicating the configured LADN information, and may send the identifier to the terminal instead of the LADN information. The identifier indicating the LADN information can be solely allocated in an AMF pool area. For reference, the AMF pool area is an area in which the terminal can receive a service without the necessity of changing a serving AMF, and one AMF pool area means an area in which the terminal can be serviced by one or more AMFs. The AMF pool area may be composed of collected tracking areas, and the AMF pool areas may overlap each other.

When the terminal performs the registration procedure for mobility management in case of using the above-described method, the AMF includes an identifier for discriminating the LADN information in the LADN information to be transmitted to the terminal. The terminal maintains and manages the LADN information. In case where the terminal performs the periodic registration procedure, the AMF transmits the identifier of the LADN information to the terminal instead of sending the LADN information. If the LADN information corresponding to the identifier of the LADN information does not exist in the terminal, the terminal may separately request the LADN information from the AMF by including an indicator for requesting the LADN information in the UE configuration information update procedure or registration update procedure.

In case where the terminal establishes the corresponding LADN session, the AMF can be aware of this in the session establishment procedure, and the AMF can omit the transmission of the LADN information in the terminal registration update procedure while the LADN session is established.

9. Schemes for Providing Additional Information to Determine Whether to Access the LADN Service When the terminal enters the registration area including the LADN, the AMF of the 5G core network provides the LADN information to the terminal. The LADN information includes service area information (data network allowed area information) in which the DNN and LADN services, which are discriminators of the data network, can be provided.

In this embodiment, a method for providing additional information for determining whether the terminal establishes the session in the LADN information will be described. The terminal determines the LADN session establishment in case where an application program of the terminal request the corresponding DNN access through a direct API or data is generated from the application program of the terminal using the corresponding DNN in accordance with the terminal route information policy as described above.

The network includes the additional information for the terminal to access the LADN session in the LADN information to be transmitted to the terminal so that the terminal can use the information as information for determining whether to access the LADN session. The additional information may include the following information.

1) Session supplier information: Information of an operator providing the session. For example, a regional operator (e.g., regional operator or public institution operator in shopping mall/airport), Internet service provider, visited network service provider, or home network service provider 2) Session billing information: Non-billing, volume-rate billing, billing for use amount quota, and time-based billing 3) QoS information provided by the session: Maximum transmission rate that can be provided, and maximum delay time 4) RAT and frequency information used by the session: 3G/4G/5G information, used frequency information 5) Session authentication information: Authentication method (EAP method information), and credential information required for the authentication (e.g., certificate or ID/PW type)

6) Initial accessed page information after session establishment: URL information to be accessed after the session access The terminal receives the above-described information on the LADN, determines the session access/non-access, and determines an authentication method necessary in the session access process.

7) Service information that can be provided by the session: For example, VoLTE service, IPTV service, remote file providing service, high-speed streaming service, VR/AR service and V2X service 8) Other session information: For example, information notifying whether the session is a subscriber-based session or a session that can be provided to all subscribers of an operator FIG. 11 is a diagram illustrating the structure of a terminal according to an embodiment of the present disclosure.

Figure 11:
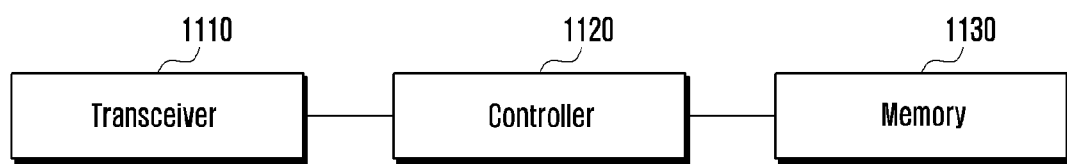
FIG. 11 is a diagram illustrating the structure of a terminal according to an embodiment of the present disclosure.

Referring to FIG. 11, in an embodiment of the present disclosure, a terminal may include a transceiver and a controller. Further, the controller may include at least one processor. The transceiver may be composed of a transmitter and/or a receiver. The transceiver may transmit and/or receive a signal. The controller may control the overall operation of the terminal. The controller may control the operation of the terminal as described above through FIGS. 1 to 10.

In addition to the terminal, each entity of FIG. 7 may include a transceiver and a controller. The transceiver of the entity may transmit and/or receive a signal, and the controller may control the operation of the entity as described above in the embodiments of the present disclosure.

Figure 12:
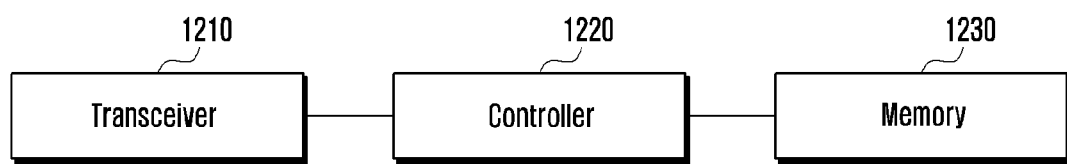
FIG. 12 is a diagram illustrating the structure of an AMF according to an embodiment of the present disclosure.
Figure 13:
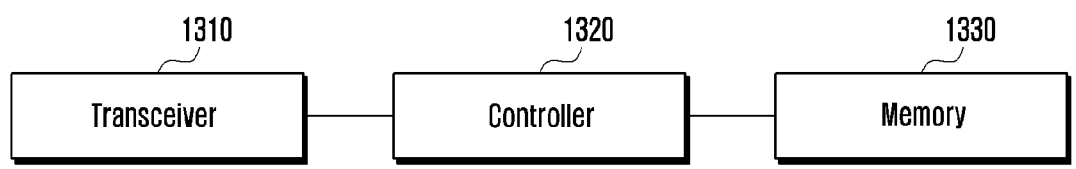
FIG. 13 is a diagram illustrating the structure of an SMF according to an embodiment of the present disclosure.

For example, FIG. 12 illustrates the structure of an AMF, and FIG. 13 illustrates the structure of an SMF.

FIG. 12 is a diagram illustrating the structure of an AMF according to an embodiment of the present disclosure.

In an embodiment of the present disclosure, an AMF may include a transceiver and a controller. Further, the controller may include at least one processor.

The transceiver may be composed of a transmitter and/or a receiver. The transceiver may transmit and/or receive a signal.

The controller may control the overall operation of the AMF. The controller may control the operation of the AMF as described above through FIGS. 1 to 10.

FIG. 13 is a diagram illustrating the structure of an SMF according to an embodiment of the present disclosure.

In an embodiment of the present disclosure, an SMF may include a transceiver and a controller. Further, the controller may include at least one processor.

The transceiver may be composed of a transmitter and/or a receiver. The transceiver may transmit and/or receive a signal.

The controller may control the overall operation of the SMF. The controller may control the operation of the SMF as described above through FIGS. 1 to 10.

Meanwhile, preferred embodiments of the present disclosure disclosed in this specification and drawings and specific terms used therein are illustrated to present only specific examples in order to clarify the technical contents of the present disclosure and help understanding of the present disclosure, but are not intended to limit the scope of the present disclosure. It will be evident to those skilled in the art that various implementations based on the technical spirit of the present disclosure are possible in addition to the disclosed embodiments.

What is claimed is:

1. A method performed by a session management function (SMF) entity in a communication system, the method comprising:
   receiving, from an access and mobility management function (AMF) entity, a request message for establishment of a protocol data unit (PDU) session for a local area data network (LADN) with respect to a terminal;
   transmitting, to the AMF entity, a response message for the establishment of the PDU session for the LADN as a response to the request message; and
   after the establishment of the PDU session for the LADN, in case that the SMF entity is notified from the AMF entity that the terminal moves out of an LADN service area that is a set of tracking areas (TAs) for the LADN, deactivating a user plane connection for the PDU session for the LADN while maintaining the PDU session for the LADN, wherein downlink data for the PDU session is discarded.

2. The method of claim 1, wherein the response message is a reject message in case that the terminal is out of the LADN service area.

3. A method performed by an access and mobility management function (AMF) entity in a communication system, the method comprising:
   transmitting, to a session management function (SMF) entity, a request message for establishment of a protocol data unit (PDU) session for a local area data network (LADN) with respect to a terminal; and
   receiving, from the SMF entity, a response message for the establishment of the PDU session for the LADN as a response to the request message,
   wherein, after the establishment of the PDU session for the LADN, in case that the AMF entity notifies the SMF entity that the terminal moves out of an LADN service area that is a set of tracking areas (TAs) for the LADN, a user plane connection for the PDU session for the LADN is deactivated while maintaining the PDU session for the LADN and downlink data for the PDU session is discarded.

4. The method of claim 3, wherein the response message is a reject message in case that the terminal is out of the LADN service area.

5. The method of claim 3, further comprising:
   receiving a request message for a registration with the terminal, the request message originating from the terminal; and
   transmitting, toward the terminal, an accept message as a response to the request message for the registration, the accept message including a data network name (DNN) of the LADN and the LADN service area.

6. The method of claim 3, further comprising:
   receiving, from the terminal, a message for requesting the establishment of the PDU session for the LADN in case that the terminal is in the LADN service area, the message originating from the terminal.

7. A session management function (SMF) entity in a communication system, the SMF entity comprising:
   a transceiver; and
   a controller coupled with the transceiver and configured to:
      receive, from an access and mobility management function (AMF) entity, a request message for establishment of a protocol data unit (PDU) session for a local area data network (LADN) with respect to a terminal, transmit, to the AMF entity, a response message for the establishment of the PDU session for the LADN as a response to the request message, and after the establishment of the PDU session for the LADN, in case that the SMF entity is notified from the AMF entity that the terminal moves out of an LADN service area that is a set of tracking areas (TAs) for the LADN, deactivate a user plane connection for the PDU session for the LADN while maintaining the PDU session for the LADN, wherein downlink data for the PDU session is discarded.

8. The SMF entity of claim 7, wherein the response message is a reject message in case that the terminal is out of the LADN service area.

9. An access and mobility management function (AMF) entity in a communication system, the AMF entity comprising:

a transceiver; and a controller coupled with the transceiver and configured to:

transmit, to a session management function (SMF) entity, a request message for establishment of a protocol data unit (PDU) session for a local area data network (LADN) with respect to a terminal, and receive, from the SMF entity, a response message for the establishment of the PDU session for the LADN as a response to the request message, wherein, after the establishment of the PDU session for the LADN, in case that the AMF entity notifies the SMF entity that the terminal moves out of an LADN service area that is a set of tracking areas (TAs) for the LADN, a user plane connection for the PDU session for the LADN is deactivated while maintaining the PDU session for the LADN and downlink data for the PDU session is discarded.

10. The AMF entity of claim 9, wherein the response message is a reject message in case that the terminal is out of the LADN service area.

11. The AMF entity of claim 9, wherein the controller is configured to:

receive a request message for a registration with the terminal, the request message originating from the terminal, and transmit, toward the terminal, an accept message as a response to the request message for the registration, the accept message including a data network name (DNN) of the LADN and the LADN service area.

12. The AMF entity of claim 9, wherein the controller is configured to receive, from the terminal, a message for requesting the establishment of the PDU session for the LADN in case that the terminal is in the LADN service area, the message originating from the terminal.

* * * * *